Nov. 2, 1954 F. L. KEISLING 2,693,578

MODULATOR SYSTEM

Filed Jan. 9, 1952

INVENTOR

BY Fred L. Keisling.

C. B. Hamilton, ATTORNEY

United States Patent Office 2,693,578

Patented Nov. 2, 1954

2,693,578

MODULATOR SYSTEM

Fred L. Keisling, Burlington, N. C., assignor to Western Electric Company, Incorporated, New York, N. Y., a corporation of New York Application January 9, 1952, Serial No. 265,564

8 Claims. (Cl. 332—48)

Figures 1, 1A:
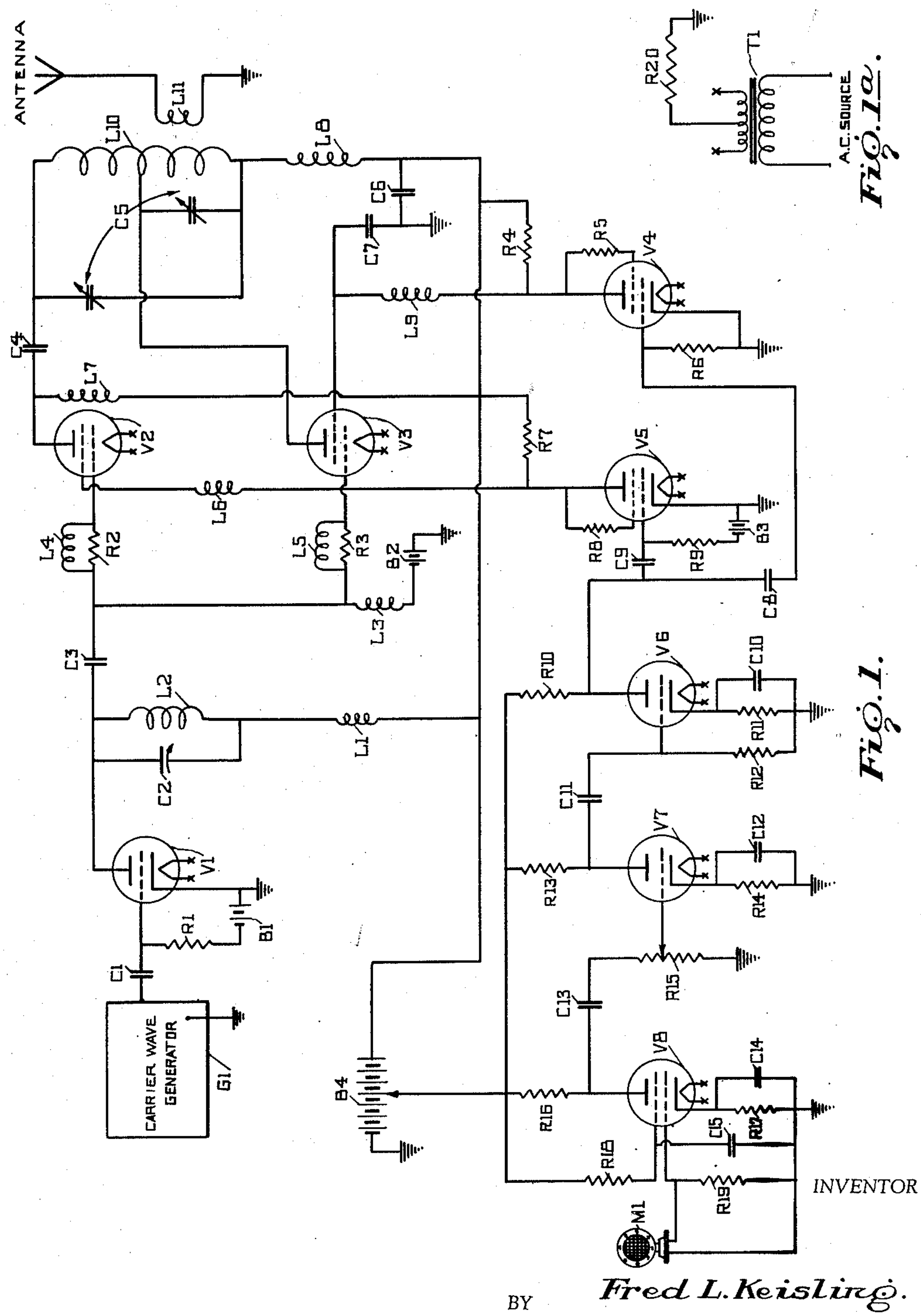

This invention relates to amplitude modulated transmission systems, and in particular to high efficiency modulator systems.

In prior modulator systems, it has been the practice to provide two separate tank circuits and to use a quarter wave line in both plate and grid circuits which are very critical in adjustment and make it impossible to change frequency without readjusting and returning the entire amplifier. Other modulator systems have used the control grid for modulation purposes and a modulation transformer with its inevitable phase and frequency distortion and resulting critical adjustment of grid voltage. Because of these and other difficulties in prior devices, the resulting modulation is often distorted, making it impossible to attain high fidelity.

An object of this invention is to provide an efficient flexible modulator system which is easy to adjust and which produces modulated waves of high fidelity.

Another object is to provide an economical and compact modulator system that eliminates the use of a modulation transformer.

Another object is a provision for producing an amplitude modulated carrier wave that will enhance the audio output at a receiving station.

Another object is to eliminate over modulation of the carrier wave.

In accordance with one embodiment of the invention, a carrier wave is applied to the control grids of a multielectrode carrier amplifier tube and a multielectrode side band amplifier tube. A modulating potential is applied to the control grids of a multielectrode negative peak trigger tube and a multielectrode positive peak trigger tube. The negative peak trigger tube is biased to produce negative voltage peaks which are coupled to the screen grid of the carrier amplifier tube, thus producing negative peaks of modulation. The positive peak trigger tube is biased to produce positive voltage peaks which are coupled to the screen grid of the side band amplifier tube thus producing positive peaks of modulation. The output of the carrier amplifier is combined with the output of the side band amplifier in a tank circuit through autotransformer action, thus producing an amplitude modulated carrier wave.

Other objects and advantages of the invention will be apparent from the following detailed description when considered in conjunction with the accompanying drawing, wherein:

Fig. 1 is a schematic circuit diagram embodying the invention, and

Fig. 1*a* is a schematic circuit diagram of the filament power supply and the cathode resistor for the vacuum tubes disclosed in Fig. 1.

In the circuit diagram battery B4 is the plate and screen voltage power supply, and batteries B1, B2, and B3 are bias voltage supplies. The A. C. filament power is supplied from a transformer T1 (Fig. 1*a*) and all the filament terminals marked *x*—*x* (Fig. 1) are connected to the terminals *x*—*x* of transformer T1.

As shown in Fig. 1, the output of a carrier wave generator G1 is coupled through a condenser C1 to the control grid of a buffer amplifier tube V1 which is provided with a grid leak resistor R1. A tank circuit made up of a condenser C2 and an inductance L2 connected in parallel is the plate load for the amplifier tube V1 and is tuned to the carrier frequency by the condenser C2. An inductance L1 is connected to the parallel circuit C2, L2 and is a radio frequency choke for the purpose of keeping the radio frequency energy out of the power supply B4. Inductances L3, L6, L7, L8, and L9 are also radio frequency chokes. The output of the tube V1 is coupled through a condenser C3 to the control grids of amplifier tubes V2 and V3 in parallel.

An inductance L4 and a resistor R2 connected in parallel provide a parasitic suppressor in the control grid lead of the amplifier tube V2, and an inductance L5 and a resistor R3 make up a parasitic suppressor in the control grid lead of the amplifier tube V3. These thermionic tubes V2 and V3 make up the final amplifier stage for the carrier wave. This final amplifier can be any pair of tetrodes, such as a carrier amplifier and a side band amplifier, with their control grids connected in parallel.

The carrier amplifier V2 is a power amplifier operating at high efficiency and at normal screen voltage to amplify the carrier wave, and when the screen grid is triggered, it also produces negative peaks of modulation; the screen grid voltage being reduced at an audio frequency rate.

The tube V3 is the side band amplifier, its screen grid voltage without modulation being quite low; in fact, it is so low, that this tube V3 contributes very little to the output when there is no modulation. However, when the screen grid of the tube V3 is triggered, the screen voltage increases at an audio frequency rate until the tube operates at normal efficiency producing side band voltages. These side band voltages from the tube V3 are fed into the midpoint of an inductor coil L10 which is part of a tuned radio frequency circuit including a variable split stator condenser C5. This tuned circuit acts as an autotransformer which doubles the side band voltage in the circuit which satisfies one requirement for 100% modulation; that is, doubling the R. F. voltage. The current in the side band amplifier V3 also increases to its normal value, which satisfies the other requirements of 100% modulation, namely, that twice the current is developed at peak modulation.

A resistor R20 (Fig. 1*a*) is only provided in the cathode circuit of the tubes V2 and V3 because they have directly heated cathodes. The resistor R20 serves two purposes; first, it improves the quality of the modulation through a slight amount of degeneration; second, it decreases the carrier output on positive peaks, enhancing the audio frequency output at the receiving station.

Thermionic tubes V6, V7, and V8 are conventional voltage amplifiers and no power amplification is necessary with this system. An audio frequency modulating potential is produced by a microphone M1 and amplified by the tubes V6, V7, and V8. These voltage amplifiers have conventional circuit components such as plate load resistors R10, R13, and R16; grid leak resistors R12, R15, and R19; cathode bias resistors R11, R14, and R17; cathode by-pass condensers C10, C12, and C14; coupling condensers C11 and C13; a screen grid by-pass condenser C15, and a screen grid voltage dropping resistor R18. The functions of all of the above-mentioned voltage amplifier circuit components are well known in the art.

The audio frequency modulating potential output of the amplifier tube V6 is coupled through condensers C8 and C9 to the control grids of trigger tubes V4 and V5 in parallel. By means of the variable resistor R15, the amplitude of the modulating potentials fed to the trigger tubes can be controlled. V4 is a multielectrode positive peak trigger tube operated without fixed bias, but a slight amount of bias is developed across its grid resistor R6. This arrangement establishes the point of operation close to the saturation point of the plate current curve. The positive half cycle of the modulating potential has little or no effect on the plate current because the tube V4 is already close to saturation. However, on the negative half cycle of the modulating potential the control grid of the tube V4 is driven negative, down along the linear portion of the curve, causing the D. C. resistance of the tube to increase and the voltage at the plate to increase. Thus the screen grid of the side band amplifier tube V3 connected directly to the plate of the tube V4 also increases at the audio frequency rate, causing the side band amplifier to send side band voltages into the plate circuit at full efficiency. These side band voltages are further doubled by the autotransformer action of the coil L10.

V5 is a multielectrode negative peak trigger tube, triggering the carrier amplifier into producing negative peaks of modulation. The control grid of the tube V5 is connected through a grid leak resistor R9 to a bias supply and operates close to cut-off at the low end of the plate current curve. The negative half cycle of the modulating potential has no effect on the plate current, but the positive half cycle drives the control grid positive along the linear portion of the curve causing the D. C. resistance of the tube V5 to decrease and the plate current to increase, thus causing a decrease of voltage at the plate. The screen grid of the amplifier tube V2 is connected directly to the plate of the trigger tube V5 to thus cause the screen grid voltage of V2 to decrease at an audio frequency rate and generate a negative modulation peak. It is impossible to over-modulate on negative peaks since the plate current of the tube V2 can never be driven to zero by the modulating potential.

A resistor R7 is common to both the plate circuit of the negative peak trigger tube V5 and the screen grid circuit of the carrier amplifier tube V2, and thus the resistor R7 in conjunction with the power supply B4 establishes an operating voltage on both the plate of the tube V5 and the screen grid of the tube V2. A resistor R4 is common to both the plate circuit of the positive peak trigger tube V4 and the screen grid circuit of the side band amplifier tube V3, and thus the resistor R4 in conjunction with the power supply B4 establishes an operating voltage on both the plate of the tube V4 and the screen grid of the tube V3. Resistors R5 and R8 are screen voltage dropping resistors in the screen grid circuit of the trigger tubes V4 and V5, respectively, and these resistors in conjunction with the power supply B4 establish the operating screen grid voltage of the trigger tubes. Condensers C6 and C7 are radio frequency by-pass condensers to keep the radio frequency out of the power supply B4. Resistors R4 and R7 are plate load resistors and resistors R5 and R8 are screen voltage dropping resistors. Condensers C6 and C7 are R. F. by-pass condensers.

A coil L11 is the antenna coupling coil which couples the energy from the output tank circuit to the antenna.

In operation, the carrier wave generator G1 is energized whereupon the carrier wave generator excites the grid of the vacuum tube V1 which then amplifies and supplies sufficient excitation voltage to the control grids of the amplifier tubes V2 and V3 which are connected in parrallel. The plates of these two tubes are then turned and coupled to the antenna system. Without modulation, the tube V2 is producing about 95% of the carrier wave output while the tube V3 is only producing about 5%; this is due to the differences of their screen voltages.

Tubes V6, V7, and V8 are voltage amplifiers which amplify the audio frequency modulating potential generated by sound being transmitted into the microphone M1. The audio frequency output of the tube V6 excites the control grids of the trigger tubes V4 and V5, whose plates are connected directly to the screen grids of the tubes V3 and V2, respectively. Because the bias voltage is sufficient to cut off the plate current of the tube V5, the screen voltage of the tube V2 is at the full rated amount until the tube V5 is triggered by the modulating potential, whereupon the screen voltage of the tube V2 drops to a lower value at an audio frequency rate to produce negative peaks of modulation. Due to the lack of bias voltage on the tube V4, the plate current thereof is at a maximum until it is triggered by the modulating potential, at which time the plate voltage increases and simultaneously the screen voltage of the tube V3 also increases to produce positive peaks of modulation at high efficiency.

It is to be understood that while the embodiment disclosed and described herein is a preferred one, the invention is susceptible to many different forms, that other instrumentalities may be substituted for those disclosed, and that various changes and modifications may be made without departing from the spirit and scope of the invention.

What is claimed is:

1. In a modulator, a multielectrode carrier amplifier tube, a multielectrode side band amplifier tube, said amplifier tubes having their control grids excited by a carrier wave, a multielectrode negative peak trigger tube having a control grid and a cathode, a circuit connecting said control grid to said cathode including means to bias said tube to cut-off, a multielectrode positive peak trigger tube having a control grid and a cathode, a circuit connecting said control grid to said cathode including means to bias said tube to plate current saturation, said trigger tubes having their control grids excited by a modulating potential, means for directly coupling the plate of the negative peak trigger tube to the screen grid of the carrier amplifier tube to produce negative peaks of modulation, and means for directly coupling the plate of the positive peak trigger tube to the screen grid of the side band amplifier tube to produce positive peaks of modulation.

2. In a modulator, a multielectrode carrier amplifier tube, a multielectrode side band amplifier tube, means for applying a carrier wave to the control grids of said amplifier tubes, a multielectrode negative peak trigger tube having a control grid and a cathode, a circuit connecting said control grid to said cathode including means to bias said tube to cut-off, a multielectrode positive peak trigger tube having a control grid and a cathode, a circuit connecting said control grid to said cathode including means to bias said tube to plate current saturation, means for applying a modulating potential to the control grids of said trigger tubes, means for directly coupling the plate of the negative peak trigger tube to the screen grid of the carrier amplifier tube to produce negative peaks of modulation, means for directly coupling the plate of the positive peak amplifier to the screen grid of the side band amplifier to produce positive peaks of modulation, an output tank circuit, and means for coupling the plates of said amplifier tubes to the output tank circuit.

3. In a system for impressing a modulating potential on a carrier wave, a multielectrode carrier amplifier tube operating with normal screen grid voltage, a multielectrode side band amplifier tube operating with low screen grid voltage, said amplifier tubes having their control grids excited by a carrier wave, a multielectrode negative peak trigger tube having a control grid and a cathode, a circuit connecting said control grid to said cathode including means to bias said tube to cut-off, a multielectrode positive peak trigger tube having a control grid and a cathode, a circuit connecting said control grid to said cathode including means to bias said tube to plate current saturation, said trigger tubes having their control grids excited by a modulating potential, means for directly coupling the plate of the negative peak trigger tube to the screen grid of the carrier amplifier tube for impressing a negative voltage peak on the carrier wave when the modulating potential causes the negative peak trigger tube to conduct, and means for directly coupling the plate of the positive peak trigger tube to the screen grid of the side band amplifier tube for impressing a positive voltage peak on the carrier wave when the modulating potential decreases the conduction of the positive peak trigger tube.

4. In a system for impressing a modulating potential on a carrier wave as defined in claim 3, including a tunable output tank circuit comprising a center-tapped coil connected in parallel with a variable split stator condenser, and means for coupling the plates of said amplifier tubes to the output tank circuit.

5. In a system for impressing a modulating potential on a carrier wave as defined in claim 3, including a resistor common to the cathode circuits of said amplifier tubes.

6. In an amplitude modulated transmission system, a generator for producing a carrier wave, a buffer amplifier, means for coupling the buffer amplifier to said generator to produce an amplified carrier wave, a multielectrode carrier amplifier tube, a multielectrode side band amplifier tube, means for applying the amplifier carrier wave to the grids of said amplifier tubes, a modulating potential source, a plurality of cascaded voltage amplifiers coupled to said source for producing an amplified modulating potential, a multielectrode negative peak trigger tube having a control grid and a cathode, a circuit connecting said control grid to said cathode including means to bias said tube to cut-off, a multielectrode positive peak trigger tube having a control grid and a cathode, a circuit connecting said control grid to said cathode including means to bias said tube to plate current saturation, means for applying the amplified modulating potential to the control grids of said trigger tubes, means for directly coupling the plate of the negative peak trigger tube to the screen grid of the carrier amplifier tube to produce negative peaks of modulation, means for directly coupling the plate of the positive peak trigger tube to the screen grid of the side band amplifier tube to produce positive peaks of modulation, an output tank circuit comprising a center tapped coil connected in parallel with a split stator condenser, means for coupling the plates of said amplifier tubes to the output tank circuit, and means for coupling energy from the output tank circuit to an antenna.

7. In an amplitude modulated transmission system as defined in claim 6, including a resistor common to the cathode circuits of said amplifier tubes.

8. In a modulating system, a carrier wave generator, a multielectrode carrier amplifier tube operating with normal screen grid voltage, a multielectrode side band amplifier tube operating with low screen grid voltage, said amplifier tubes having their control grids connected in parallel and coupled to the carrier wave generator, a modulating potential source, a multielectrode negative peak trigger tube biased to cut-off, a multielectrode positive peak trigger tube biased to plate current saturation, said trigger tubes having their control grids connected in parallel and coupled to the modulating potential source, means for directly coupling the plate of the negative peak trigger tube to the screen grid of the carrier amplifier tube for impressing a negative voltage peak on the carrier wave when the modulating potential causes the negative peak trigger tube to conduct, means for directly coupling the plate of the positive peak trigger tube to the screen grid of the side band amplifier tube for impressing a positive voltage peak on the carrier wave when the modulating potential decreases the conduction of the positive peak trigger tube, an output tank circuit having a center-tapped coil connected in parallel with a variable split-stator condenser, means for impressing the modulated plate output of the carrier wave amplifier tube across the output tank circuit, means for impressing the modulated plate output of the side band amplifier tube across one half of said output tank circuit, means for coupling energy from the output tank circuit to an antenna, and a resistor common to the cathode circuits of the carrier wave amplifier tube and the side band amplifier tube for improving the quality of the modulation through a slight amount of degeneration.

References Cited in the file of this patent

UNITED STATES PATENTS

| Number | Name | Date |
|---|---|---|
| 1,904,877 | Parvin | Apr. 18, 1933 |
| 2,206,585 | Senauke | Oct. 28, 1941 |
| 2,282,347 | Taylor | May 12, 1942 |
| 2,445,938 | Cavanagh | July 27, 1948 |
| 2,487,212 | Bell | Nov. 8, 1949 |